F. I. JOHNSON.
METALLIC TIRE FOR VEHICLES.
APPLICATION FILED JUNE 18, 1915.

1,263,558.

Patented Apr. 23, 1918.

Inventor
Frederic I. Johnson.
By George H. Kennedy
Attorney

UNITED STATES PATENT OFFICE.

FREDERIC I. JOHNSON, OF FITCHBURG, MASSACHUSETTS, ASSIGNOR TO JOHNSON PNEU-METAL TIRE COMPANY, OF FITCHBURG, MASSACHUSETTS, A CORPORATION OF MASSACHUSETTS.

METALLIC TIRE FOR VEHICLES.

1,263,558.  Specification of Letters Patent.  Patented Apr. 23, 1918.

Application filed June 18, 1915. Serial No. 34,938.

*To all whom it may concern:*

Be it known that I, FREDERIC I. JOHNSON, a citizen of the United States, residing at Fitchburg, in the county of Worcester and Commonwealth of Massachusetts, have invented a new and useful Improvement in Metallic Tires for Vehicles, of which the following is a specification, accompanied by drawings forming a part of the same.

The object of my present invention is to provide means for attaching a nonmetallic tread to a metallic vehicle tire, and I accomplish this object by the construction and arrangement of parts as hereinafter described and pointed out in the annexed claims.

Referring to the accompanying drawings.

Similar reference characters refer to similar parts in the different figures.

Figure 1:
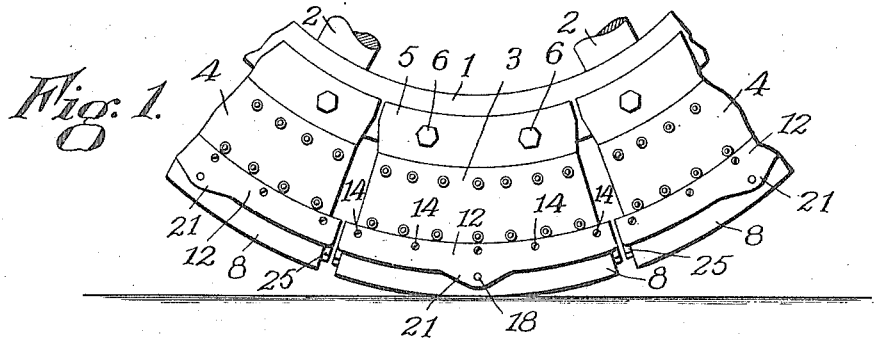
Figure 1 represents a portion of a vehicle wheel having a sectional metallic tire attached thereto.
Figure 2:
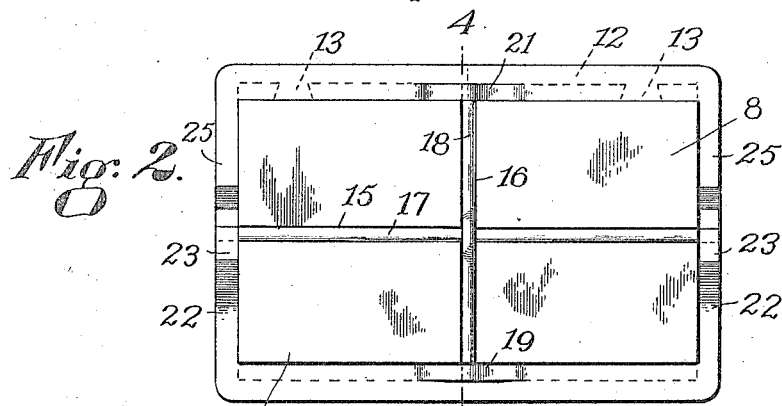
Fig. 2 is a detached view of one of the tire sections showing the tread or that portion coming in contact with the ground.

Referring to Fig. 1, 1 denotes a portion of the rim of the wheel mounted in the usual manner upon spokes 2, 2. Attached to the wheel rim 1 is a metallic tire formed in sections, one of which is shown entire at 3, and portions of the adjacent sections are shown at 4, 4. As the sections of metallic tires are duplicates of each other, a description of one will be sufficient. Each section is attached to the rim of the wheel by flanges 5 and bolts 6, 6. Between the rim of the wheel and an outer tread plate 7 coiled springs are interposed in the usual manner to impart a resiliency to each section. These springs, however, are omitted from the drawings as they form no part of my present invention, which relates solely to the employment of a nonmetallic block and means for securing the same to the outer surface of the tread plate. The nonmetallic block 8 may consist of any suitable material adapted to resist the wear incident to the use of a vehicle wheel, such as wood, rubber, leather, etc. Or, if desired, such a nonmetallic block may consists of suitable layers of fabric or cloth, with their edges in contact with the ground, the layers being cemented and compressed into a substantially integral form. It is obvious that any suitable material may be employed for this purpose, viz., a block of considerable rigidity which will reduce the noise accompanying the use of a metallic tire by affording a partially yielding surface. The nonmetallic block 8 is placed upon the tread plate 7 and is provided upon each side with shoulders 9 9, which are inclosed by lips 10 and 11. The lip 10 is formed integral with the tread plate 7, while the lip 11 is formed upon a detachable piece 12 provided upon its inner side with dove-tailed ribs 13, 13 which fit dove-tailed recesses in the edge of the nonmetallic block 8 and also in the edge of the tread plate 7.

Figure 3:
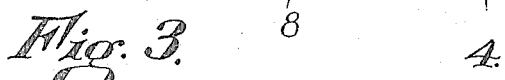
Fig. 3 is an end view of one of the tire sections.
Figure 4:
Fig. 4 is a sectional view of the same on the plane of the broken line 4—4, Fig. 2.
Figure 5:
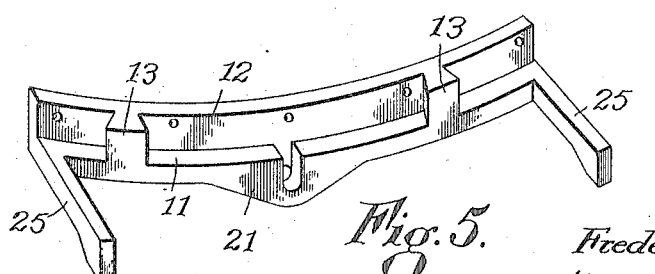
Fig. 5 is a detached perspective view of one of the detachable side pieces by which a nonmetallic block or tread piece is attached to the metallic section of the tire.

The nonmetallic block is applied to the tread plate by a sidewise movement which inserts the shoulder 9 beneath the lip 10. The piece 12 carrying the lip 11 is then inserted by a radial movement in the edge of the block 8 and the tread plate 7 and is held from falling out by screws 14. The nonmetallic block 8 is provided with a longitudinal groove 15 and a transverse groove 16 to receive rods 17 and 18 which are embedded in the face of the block 8. Mounted upon the lip 10 is a lug 19 provided with a hole 20 to receive the end of the rod 18, and mounted upon the lip 11 is a lug 21 to receive the opposite end of the rod 18. Mounted upon the opposite ends of the tread plate 7 are ribs, one of which is shown at 22, Fig. 3. The ends of these ribs are provided with hooks 23 beneath which the ends 24 of the longitudinal rods 17 are slipped, as the non metallic blocks are inserted in place. The detachable piece 12 carries upon each end a rib 25, one of which is shown in Fig. 3. The ends of the ribs 25 abut against the ends of the hooks 23, as shown in Fig. 3.

I claim,

1. In a metallic tire for vehicle wheels comprising a series of spaced tread plates mounted upon the rim of the wheel, a pair of ribs extending transversely halfway across the ends of the tread plate, with hooks at their inner ends, a non-metallic block fitting the tread plate between said ribs and having a central longitudinal groove upon its outer surface, a retaining rod lying in said groove and engaged by said hooks, and means for retaining the side edges of said nonmetallic block.

2. In a metallic tire for vehicle wheels comprising a series of spaced tread plates mounted upon the rim of the wheel, hooks projecting from the center of the tread plate at the ends thereof, a nonmetallic block seated on the tread plate and having a central longitudinal groove on its outer surface, a retaining rod lying in said groove with its ends engaged by said hooks, a lip integral with the tread plate and at one side thereof engaging said nonmetallic block, a detachable member at the opposite side of the tread plate having a lip engaging said nonmetallic block, and ribs projecting from said detachable member abutting the open side of said hooks to close the same.

3. In a metallic tire for vehicle wheels comprising a series of spaced tread plates mounted upon the rim of the wheel, a nonmetallic block seated upon the tread plate and provided with a central longitudinal groove and a central transverse groove in its outer surface, retaining rods inserted in said grooves, and means for maintaining said rods in fixed relation to the tread plate.

4. In a metallic tire for vehicle wheels comprising a series of spaced tread plates, a nonmetallic block mounted upon the outer surface of a tread plate and having a longitudinal groove in its outer surface, means for securing the side edges of said block to the tread plate, a retaining rod removably held in said groove and projecting beyond the ends of said block, and means for engaging the ends of said rod to hold it in fixed relation to the tread plate.

5. In a metallic tire for vehicle wheels comprising a series of spaced tread plates, a nonmetallic block mounted on the outer surface of a tread plate and having a transverse groove in its outer surface, a removable retaining rod held in said groove with its ends projecting beyond said block, means for engaging the ends of said rod to hold it in fixed relation to the tread plate, and means for preventing the longitudinal movement of said block on its tread plate.

FREDERIC I. JOHNSON.

Witnesses:
PENELOPE COMBERBACH,
NELLIE WHALEN.

Copies of this patent may be obtained for five cents each, by addressing the "Commissioner of Patents, Washington, D. C."